US010602090B2

(12) United States Patent
Ahn et al.

(10) Patent No.: US 10,602,090 B2
(45) Date of Patent: Mar. 24, 2020

(54) VIDEO CALL METHOD AND VIDEO CALL MEDIATING APPARATUS

(71) Applicant: HYPERCONNECT, INC., Seoul (KR)

(72) Inventors: Sangil Ahn, Cheongju-si (KR); Yongje Lee, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/275,578

(22) Filed: Feb. 14, 2019

(65) Prior Publication Data

US 2019/0268567 A1 Aug. 29, 2019

(30) Foreign Application Priority Data

Feb. 28, 2018 (KR) ........................ 10-2018-0024188

(51) Int. Cl.
*H04N 7/14* (2006.01)
*G06F 3/01* (2006.01)

(52) U.S. Cl.
CPC ............ *H04N 7/147* (2013.01); *G06F 3/013* (2013.01)

(58) Field of Classification Search
CPC ........................................................ H04N 7/14
See application file for complete search history.

(56) References Cited

U.S. PATENT DOCUMENTS 9,681,099 B1 * 6/2017 Deets, Jr. ............... H04N 7/147
2012/0268553 A1 * 10/2012 Talukder ............. H04L 12/1818 348/14.08
2014/0022334 A1 * 1/2014 Lockhart ................ H04N 7/152 348/14.09
2015/0022625 A1 * 1/2015 Thapa ...................... H04N 7/15 348/14.08
2016/0173821 A1 * 6/2016 De Magalhaes ......... H04N 7/15 348/14.08
2016/0255126 A1 * 9/2016 Sarris ................. H04L 65/1096 348/14.08
2017/0324785 A1 * 11/2017 Taine ................. H04L 65/1069

* cited by examiner

*Primary Examiner* — Olisa Anwah
(74) *Attorney, Agent, or Firm* — Sughrue Mion, PLLC

(57) ABSTRACT

The video call method includes establishing, by a first terminal, a first video call session with a second terminal; establishing, by the first terminal, a second video call session with a third terminal; displaying, by the first terminal, a first video received from the second terminal through the first video call session and a second video received from the third terminal through the second video call session on a first display area and on a second display area, respectively; detecting, by the first terminal, a predetermined event; terminating, by the first terminal, one video call session among the plurality of video call sessions in response to the detecting the predetermined event; establishing, by the first terminal, a third video call session with a fourth terminal; displaying, by the first terminal, a third video received from the fourth terminal through the third video call session on a third display area.

15 Claims, 11 Drawing Sheets

START

RECEIVE INFORMATION CORRESPONDING TO ONE-TO-ONE VIDEO CALL REQUEST FROM ONE TERMINAL TO ANOTHER, AFTER ONE VIDEO CALL SESSEION HAS BEEN RETAINED LONGER THAN REFERENCE TIME — S310

RECEIVE INFORMATION CORRESPONDING TO ACCEPTANCE OF A USER OF THE ANOTHER TERMINAL — S320

BLOCK REMAINING VIDEO CALL SESSEIONS EXCEPT FOR A VIDEO CALL SESSION BETWEEN THE ONE TERMIANL AND THE ANOTHER — S330

END

VIDEO CALL METHOD AND VIDEO CALL MEDIATING APPARATUS

CROSS-REFERENCE TO THE RELATED APPLICATION

This application claims priority from Korean Patent Application No. 10-2018-0024188, filed on Feb. 28, 2018, the disclosure of which is incorporated herein in its entirely by reference.

BACKGROUND

1. Field

The disclosed embodiments relate to video call method and video call mediating apparatus, capable of replacing one of video call counterparts to a new person when a user multiple video calling simultaneously, or capable of switching a plurality of video call to one to one video call with one user among a plurality of the video call counterparts if a predetermined condition meets.

2. Description of the Related Art

As communication technologies develop and electronic devices become miniaturized, personal terminals are coming into wide use for general consumers. Especially, in recent days, portable personal terminals such as smart phones and smart tablet PCs are becoming widely used. Most of the terminals include communication functions. Using these terminals, a user may search the Internet or exchange messages with other users.

Also, as miniature camera technologies, miniature microphone technologies, miniature display technologies and miniature speaker technologies develop, most terminals such as smart phones include camera, microphones, display and speakers. A user may record sound and take videos including voices by using these terminals. A user may listen to recorded sound by using speakers of a terminal or watch videos through display of the terminal.

Also, a user may share recorded sound and videos with other users by using communication function of a terminal. A user may transfer recorded sound and videos to other users. Moreover, a user may record sound and videos and transfer them to other users simultaneously.

Also, at the same time, the other users may record sound and videos and transfer them to the user simultaneously. A display of a terminal may display videos being taken by the terminal or videos being taken by the other user's terminal. Also, speakers of a terminal may play sound being recorded by the other user's terminal simultaneously. That is, each of a user and another user may video calling by using their terminals.

Also, only one person may be mediated to a user, however, there may be more than one person to be mediated. At this time, a user may have to maintain video call with unpreferable counterpart if the user is not able to exclude some of counterparts. Especially, a user may have to bear uncomfortable situation which the user can not exclude a video call even if the user is exposed to improper video or sound.

SUMMARY

According to the disclosed embodiments, there may be provided video call method and video call mediating apparatus that is capable of easily replacing one or more video call counterparts, according to a user's selection who is simultaneously video calling with a plurality of counterparts.

Further, according to embodiments, there may be provided video call method and video call mediating apparatus that is capable of easily replacing one or more video call counterparts, in accordance with a user's video call conditions who is simultaneously video calling with a plurality of counterparts.

Further, according to embodiments, there may be provided video call method and video call mediating apparatus capable of switching one to many video call to one to one video call, according to a user's selection who is simultaneously video calling with a plurality of counterparts.

A video call method according to an embodiment of the present disclosure includes establishing, by a first terminal, a first video call session with a second terminal; establishing, by the first terminal, a second video call session with a third terminal; displaying, by the first terminal, a first video received from the second terminal through the first video call session and a second video received from the third terminal through the second video call session, respectively on a first display area and on a second display area; detecting, by the first terminal, a predetermined event while a plurality of video call sessions including the first and the second video call sessions are retaining; terminating, by the first terminal, one of video call session among the plurality of video call sessions in response to the detected predetermined event; establishing, by the first terminal, a third video call session with a fourth terminal; displaying, by the first terminal, a third video received from the fourth terminal through the third video call session, on a third display area.

According to some embodiments, the method may further include receiving, by the second terminal, a fourth video from the first terminal through the first video call session; and displaying, by the second terminal, the fourth video on a display area of the second terminal.

According to some embodiments, the method may further include receiving, by the third terminal, a fourth video from the first terminal through the second video call session; and displaying, by the third terminal, the fourth video on a display area of the third terminal.

According to some embodiments, the detecting the predetermined event comprises, detecting a swipe input to one of the first to third display areas.

According to some embodiments, the detecting predetermined event and the terminating one of the video call session among the plurality of video call sessions comprises, detecting direction of a user's eyes who is using the first terminal, by using a camera included in the first terminal; determining whether the detected direction is pointing one of the first to third display areas longer than a reference time; and maintaining a video call session corresponding to the pointed display area and terminating other video call sessions, based on the determination.

According to some embodiments, a size of the third display area is bigger than each size of the other display areas corresponding to maintained video call sessions.

According to some embodiments, after one of video call session among the plurality of video call sessions has been retained longer than a predetermined time, receiving information corresponding to a request from one of the first to fourth terminals which established a video call session with another terminal, wherein the request is for one to one video call with the another terminal; receiving information corresponding to acceptance from a user of the another terminal; and blocking all video call sessions except for a video call session between the terminal requested the one to one video call and the another terminal.

According to some embodiments, the method may further comprises receiving information corresponding to a request from one of the first to fourth terminals which established a video call session with another terminal, wherein the request is for one to one video call with the another terminal and information corresponding to virtual goods available for the one to one video call service; and blocking all video call sessions except for a video call session between the terminal requested the one to one video call and the another terminal.

According to some embodiments, the selecting, by the server, the terminal to be matched with the first terminal based on the received face recognition result, in response to the second matching request may include, in response to the number of the faces detected being plural, and in response to the face recognition result received from the first terminal from among the at least one or more terminal including information on the number of the faces that is two or more, selecting, by the server, a terminal that provided two or more face recognition results from among the at least one or more terminal as the terminal to be matched with the first terminal.

Further, there may be a computer-readable recording medium having recorded thereon a program for executing, in a computer the video call method.

A video call mediating apparatus according to an embodiment of the present disclosure includes a communication interface communicating with each of a plurality of terminals supporting video call; a storage; a processor; and a memory storing instructions executable by the processor, wherein, the processor, by executing the instructions, establishing a first video call session between a first terminal and a second terminal, establishing a second video call session between the first terminal and a third terminal, displaying a first video received from the second terminal through the first video call session and a second video received from the third terminal through the second video call session on a first display area and on a second display area of the first terminal respectively, detecting a predetermined event while a plurality of video call sessions including the first and the second video call sessions are retaining, terminating one of video call session among the plurality of video call sessions in response to the detected predetermined event, establishing a third video call session between the first terminal and a fourth terminal, displaying a third video received from the fourth terminal through the third video call session on a third display area of the first terminal.

According to some embodiments, the predetermined event is a swipe input to one of the first to third display areas.

According to some embodiments, the processor, detecting direction of a user's eyes who is using the first terminal, by using a camera included in the first terminal, determining whether the detected direction is pointing one of the first to third display areas longer than a reference time, and maintaining a video call session corresponding to the pointed display area and terminating other video call sessions, based on the determination.

According to some embodiments, the third display area is corresponding to the terminated video call session.

According to some embodiments, a size of the third display area is bigger than each size of the other display areas corresponding to maintained video call sessions.

According to some embodiments, there processor, receiving information corresponding to a request from one of the first to fourth terminals which established a video call with another terminal, wherein the request is for one to one video call with the another terminal, receiving information corresponding to acceptance from a user of the another terminal, blocking all video call sessions except for a video call session between the terminal requested the one to one video call and the another terminal.

Further, according to some embodiments, the processor, receiving information corresponding to a request from one of the first to fourth terminals which established a video call session with another terminal and information corresponding to virtual goods available for the one to one video call service, blocking all video call sessions except for a video call session between the terminal requested the one to one video call and the another terminal, wherein the request is for one to one video call with the another terminal.

DETAILED DESCRIPTION

Figure 1:
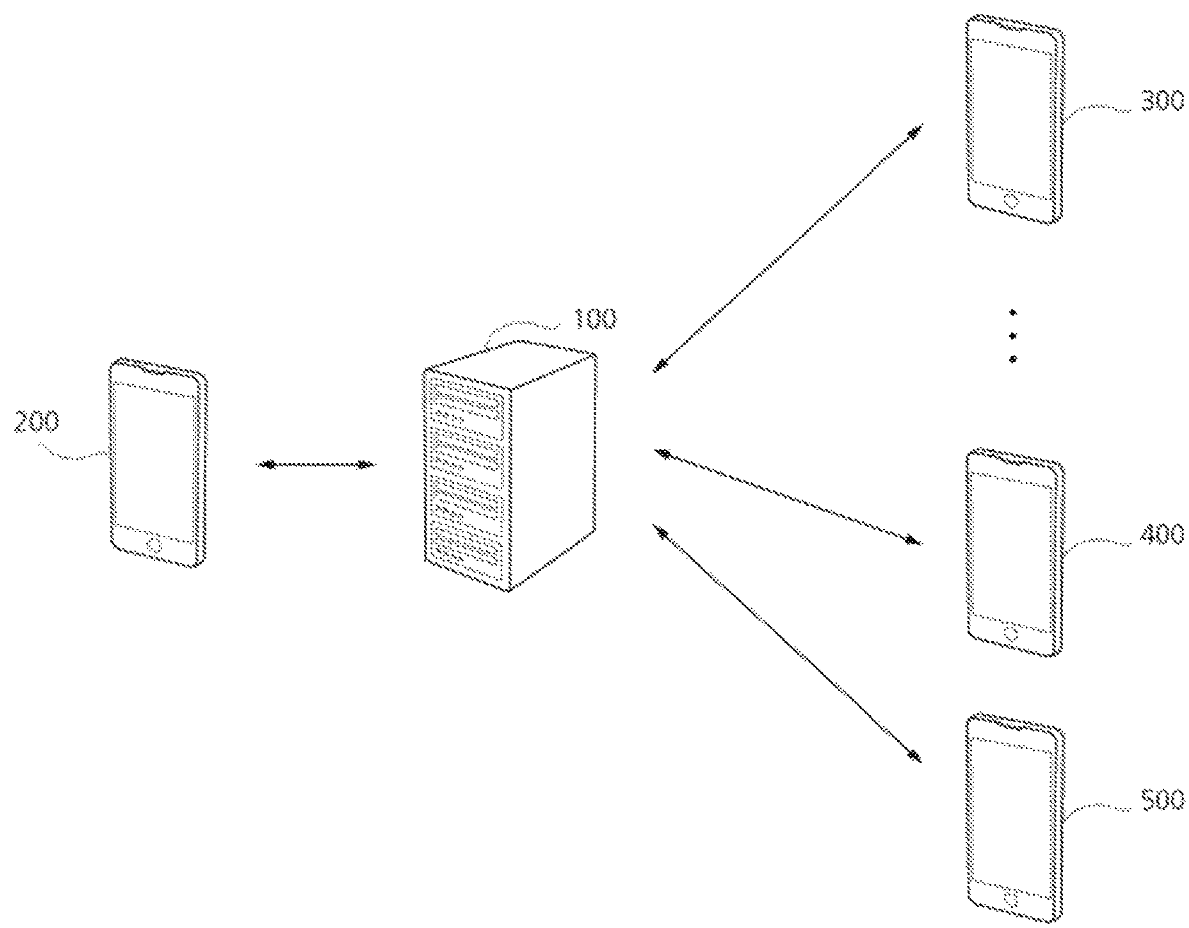
FIG. 1 is a network configuration diagram illustrating an environment where a video call apparatus operates according to an embodiment of the present disclosure.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be realized in various different forms, and the present embodiments are provided merely for the purpose of complete disclosure of the present disclosure, and for the purpose of informing a person skilled in the art of the scope of the present disclosure, and the present disclosure is to be defined only by the scope of the claims. Like reference numerals indicate like configurative elements through the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to explain the embodiments, and not to limit the present disclosure. In the present specification, a singular form includes plural forms unless specially mentioned otherwise. “Comprises” or “comprising” used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

Hereinafter, with reference to FIGS. 1 to 11, a first terminal 200, a second terminal 300, a third terminal 400, and a fourth terminal 500, and video call method and video call mediating method according to embodiments will be described in detail.

FIG. 1 is a network configuration diagram illustrating an environment where a video call apparatus operates according to an embodiment of the present disclosure. Referring to FIG. 1, the environment where the first terminal 200, the second terminal 300, the third terminal 400, and the fourth terminal 500 operates may include a server 100 and the first terminal 200, the second terminal 300, the third terminal 400, and the fourth terminal 500 each connected to the server 100. For convenience to describe, only four terminals, which is the first terminal 200, the second terminal 300, the third terminal 400, and the fourth terminal 500, are illustrated in FIG. 1, more terminals may be included in the network. Unless specifically addressed otherwise, descriptions about the first terminal 200, the second terminal 300, the third terminal 400, and the fourth terminal 500 may be applied to additional terminal.

The server 100 may be connected to a communication network. The sever 100 may be connected to other external devices via the communication network. The server 100 may transfer data to the connected other devices and receive data from the other devices.

The communication network may be implemented using a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), Zigbee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

The server 100 may be connected to at least one of the first terminal 200, the second terminal 300, the third terminal 400, and the fourth terminal 500 via the communication network. When the server 100 is connected to the first terminal 200, the server 100 may transmit data to the first terminal 200 and receive data from the first terminal 200 via the communication network. When the server 100 is connected to the second terminal 300, the server 100 may transmit data to the second terminal 300 and receive data from the second terminal 300 via the communication network. When the server 100 is connected to the third terminal 400, the server 100 may transmit data to the third terminal 400 and receive data from the third terminal 400 via the communication network. When the server 100 is connected to the first terminal 200, the server 100 may transmit data to the fourth terminal 500 and receive data from the fourth terminal 500 via the communication network.

The server 100 may receive data from at least one of the first terminal 200, the second terminal 300, the third terminal 400, and the fourth terminal 500. The server 100 may perform operations by using data received from at least one of the first terminal 200, the second terminal 300, the third terminal 400, and the fourth terminal 500. The server 100 may transmit results of the operations to at least one of the first terminal 200, the second terminal 300, the third terminal 400, and the fourth terminal 500.

The server 100 may receive requests for mediating video call from a plurality of the first terminal 200, the second terminal 300, the third terminal 400, and the fourth terminal 500. The server 100 may select a plurality of terminals which transmitted video call mediating requests. For example, the server 100 may select the first terminal 200 and the second terminal 300 from the first terminal 200, the second terminal 300, the third terminal 400, and the fourth terminal 500.

The server 100 may mediate video call between the selected first terminal 200 and the selected second terminal 300. For example, the server 100 may transmit connection information on the first terminal 200 to the second terminal 300. For another example, the server 100 may transmit connection information on the second terminal 300 to the first terminal 300.

The connection information on the first terminal 200 may include, for example, IP address and port number of the first terminal 200. The second terminal 300 which received the connection information on the first terminal 200 may attempt to connect to the first terminal 200 by using the received connection information.

The connection information on the second terminal 300 may include, for example, IP address and port number of the second terminal 300. The first terminal 200 which received the connection information on the second terminal 300 may attempt to connect to the second terminal 300 by using the received connection information.

As an attempting to connect to the second terminal 300 of the first terminal 200 succeeds or an attempting to connect to the first terminal 200 of the second terminal 300 succeeds, a video call session between the first terminal 200 and the second terminal 300 may be established. The first terminal 200 may transmit images and sound to the second terminal 300 via the video call session. The first terminal 200 may encode images and sound into digital signals and transmit the encoded results to the second terminal 300.

The second terminal 300 may transmit images and sound to the first terminal 200 via the video call session. Also, the second terminal 300 may receive images and sound from the first terminal 200 via the video call session. Hereby, a user of the first terminal 200 and a user of the second terminal 300 may video call with each other.

The first terminal 200, the second terminal 300, the third terminal 400, and the fourth terminal 500, for example, may be desktop computers, laptop computers, smart phones, smart tablet PCs, smart watches, mobile terminals, wearable devices, or portable electronic devices. The first terminal 200, the second terminal 300, the third terminal 400, and the fourth terminal 500 may execute programs or applications.

Each of the first terminal 200, the second terminal 300, the third terminal 400, and the fourth terminal 500 may be devices of the same kind or may not be devices of the same kind.

Figure 2:
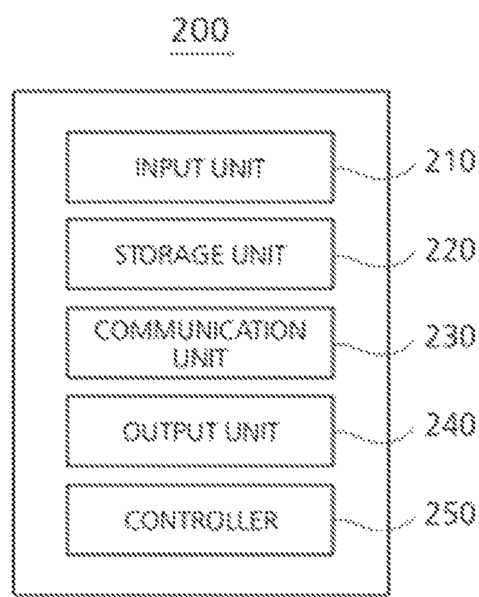
FIG. 2 is a block diagram illustrating a terminal according to an embodiment of the present disclosure.

FIG. 2 is a block diagram illustrating a terminal according to an embodiment of the present disclosure. The configuration of the second terminal 300, the third terminal 400, and the fourth terminal 500 may be the same as or different from the configuration of the first terminal 200. The description of the first terminal 200 below may be applied to the second terminal 300 or the third terminal 400. Referring to FIG. 2, the first terminal 200 according to an embodiment may include an input unit 210, storage unit 220, communication unit 230, output unit 240, and controller 250.

The input unit 210 may receive an input from the outside. The input unit 210 may receive an input from a user of the first terminal 200. The input unit 210 may receive signals from external devices. The input unit 210 may include, for example, a microphone, a camera, a keyboard, a mouse, a trackball, a touch screen, a button, a switch, a sensor, a network interface, or other input device.

The input unit 210 may receive light from outside through a camera included in the input unit 210. The input unit 210 may receive light emitted from external objects or reflected from external objects. The input unit 210 may continuously photograph images of periphery of the first terminal 200 through the camera. The input unit 210 may capture images of a user of the first terminal 200.

The input unit 210 may receive sound from outside through a microphone included in the input unit 210. The input unit 210 may receive voices from a user of the first terminal 200. Also, the input unit 210 may receive sound from an external sound reproducing apparatus. The input unit 210 may successively record sound from the surroundings of the first terminal 200 through the microphone. The input unit 210 may record the voice of the user of the first terminal 200.

The storage unit 220 may store data. The storage unit 220 may store received input by the input unit 210. The storage unit 220 may store images captured by the input unit 210 or sound recorded by the input unit 210. The storage unit 220 may store data to be used by the controller 250 to perform an operation. The storage unit 250 may store operation results performed by the controller 250. For example, the storage unit 250 may store images or sound encoded by the controller 250. The storage unit 250 may store data to be transmitted to the exterior by the communication unit 230 or may store received from the exterior by the communication unit 230.

The storage unit 220 may include a volatile memory or nonvolatile memory. The storage unit 220 may include at least one of flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) and register, for example. The storage unit 220 may include file system, database, and embedded database etc., for example.

The communication unit 230 may transmit data to the exterior or may receive data from the exterior. The communication unit 230 may transmit data to other terminals, the second terminal 300, the third terminal 400, or the fourth terminal 500, for example, or the server 100. The communication unit 230 may receive data from other terminals or the server 100. The communication unit 230 may transmit operation results performed by the controller 250 to the exterior. Also, the communication unit 230 may transmit data stored in the storage unit 220. The communication unit 230 may transmit images captured by the input unit 210 or sound recorded by the input unit 210 to the exterior.

Data to be transmitted by the communication unit 230 or received data by the communication unit 230 may be stored in the storage unit 220. For example, the communication unit 230 may transmit encoded images or sound stored in the storage unit 220 to the server 100 or to other video call devices 300, 400. Also, the communication unit 230 may receive encoded images or sound by other terminals from other terminals.

The communication unit 230 may include a remote distance network interface such as 3G module, LTE module, LTE-A module, Wi-Fi module, WiGig module, Ultra Wide Band (UWB) module and LAN card, etc., for example. Further, the communication unit 230 may include a short distance network interface such as Magnetic Secure Transmission (MST) module, Bluetooth module, NFC module, RFID module, ZigBee module, Z-Wave module and infrared ray module, etc. Further, the communication unit 230 may include other network interfaces.

The output unit 240 may output signals to the exterior. The output unit 240 may display a screen, reproduce sound, or output a vibration, for example. The output unit 240 may include a display, a speaker, a vibrator, an oscillator, or other output devices.

The output unit 240 may display a screen. The controller 250 may control the output unit 240 to display a screen. The output unit 240 may display a user interface. The output unit 240 may display another screen in response to an input from a user.

The output unit 240 may display data. The output unit 240 may display operation results performed by the controller 250. The output unit 240 may display data stored in the storage unit 220. The output unit 240 may display data received by the communication unit 230.

The output unit 240 may display images of a user of the first terminal 200 captured by the input unit 210 or may display images of other users captured by other terminals. Also, the output unit 240 may reproduce voice of a user of the first terminal 200 recorded by the input unit 210 or may reproduce voice of other users recorded by other terminals.

The output unit 240 may include flat-panel display apparatus such as Liquid Crystal Display (LCD), Organic Light Emitting Diode (OLED), or Plasma Display Panel (PDP), etc., for example. The output unit 240 may include curved display or flexible display. The output unit 240 may include a touch screen.

The controller 250 may control operations of the first terminal 200. The controller 250 may be connected to each component included in the first terminal 200. The controller 250 may control operations of each component included in the first terminal 200.

The controller 250 may process signals. The controller 250 may process signals received by the input unit 210. For example, the controller 250 may process requests of a user received through the input unit 210. The controller 250 may process images of user captured by the camera included in the input unit 210. The controller 250 may process sound or voice of a user recorded by the microphone included in the input unit 210.

The controller 250 may process signals received by the communication unit 230. For example, the controller 250 may process requests of a user received by the communication unit 230. The controller 250 may process other users' images or voices received by the communication unit 230.

The controller 250 may control operations of the first terminal 200 in response to signals received by the input unit 210. The controller 250 may control operations of the first terminal 200 in response to user's requests received by the input unit 210.

The controller 250 may perform operations. The controller 250 may perform operations in accordance with signals received by the input unit 210. The controller 250 may perform operations in accordance with received signals by the input unit 210 or by using stored data in the storage unit 220. For example, the controller 250 may perform an image processing by using captured images by the camera included in the input unit 210. The controller 250 may encode images captured by the input unit 210. The controller 250 may process sound or voice recorded by the input unit 210.

The controller 250 may decode other users' images or voice received by the communication unit 230. The controller 250 may perform post processing the decoded images or voice. For example, the controller 250 may perform image processing other users' images received by the communication unit 230.

The controller 250 may control the operation results to be stored in the storage unit 220. The controller 250 may control the operation results to be output by the output unit 240. The controller 250 may control the operation results to be transmitted to other terminals by the communication unit 230.

The controller 250 may include, for example, a Central Processing Unit (CPU), a Graphic Processing Unit (GPU), a Micro Controller Unit (MCU), or a microprocessor.

The second terminal 300 may be a terminal of the same type as the first terminal 200 or may not be a terminal of a different type. The second terminal 300 may execute a program or an application.

The second terminal 300 may be connected to the communication network. The second terminal 300 may be connected to other external device via the communication network. The second terminal 300 may transmit data to the connected other device or may receive data from the connected other device.

The second terminal 300 and the first terminal 200 may be connected to each other by mediating of the server 100. The second terminal 300 may transmit data to the first terminal 200 or may receive data from the first terminal 200. The first terminal 200 and the second terminal 300 connected to each other may transmit and receive messages, files, data, images, videos, sound or voice.

The second terminal 300 may establish a voice call session or video call session with the first terminal 200. The video call session may be established by using Transmission Control Protocol (TCP), User Datagram Protocol (UDP), or Web Real-Time Communication (WebRTC), etc., for example. A user of the first terminal 200 and a user of the second terminal 300 may voice call or video call by using the voice call session or the video call session.

The video call session may be established directly between the first terminal 200 and the second terminal 300. According to another embodiment, the video call session may be established between the first terminal 200 and the second terminal 300 via at least one or more other devices. For example, the video call session may include a session established between the first terminal 200 and the server 100, and a session established between the server 100 and the second terminal 300.

The first terminal 200 and the second terminal 300 may directly transmit and receive data each other. Also, the first terminal 200 and the second terminal 300 may transmit and receive data each other via the server 100 or other devices.

The third terminal 400 may be a terminal of the same type as the first terminal 200 or may not be a terminal of a different type. The third terminal 400 may be a terminal of the same type as the second terminal 300 or may not be a terminal of a different type. The third terminal 400 may execute programs or applications.

The third terminal 400 may be connected to the communication network. The third terminal 400 and other external devices may be connected to each other through the communication network. The third terminal 400 may transmit data to the connected other devices or may receive data from the connected other devices.

The fourth terminal 500 may be a terminal of the same type as the first terminal 200 or may not be a terminal of a different type. The fourth terminal 500 may be a terminal of the same type as the second terminal 300 or may not be a terminal of a different type. The fourth terminal 500 may be a terminal of the same type as the third terminal 400 or may not be a terminal of a different type. The fourth terminal 500 may execute programs or applications.

The fourth terminal 500 may be connected to the communication network. The fourth terminal 500 and other external devices may be connected to each other through the communication network. The fourth terminal 500 may transmit data to the connected other devices or may receive data from the connected other devices.

The terms of the components of the terminal described above may be changed. In addition, the terminals according to the present disclosure may be configured to include at least one of the above-described components, and some of the components may be omitted or the terminals may further include other additional components.

Figure 3:
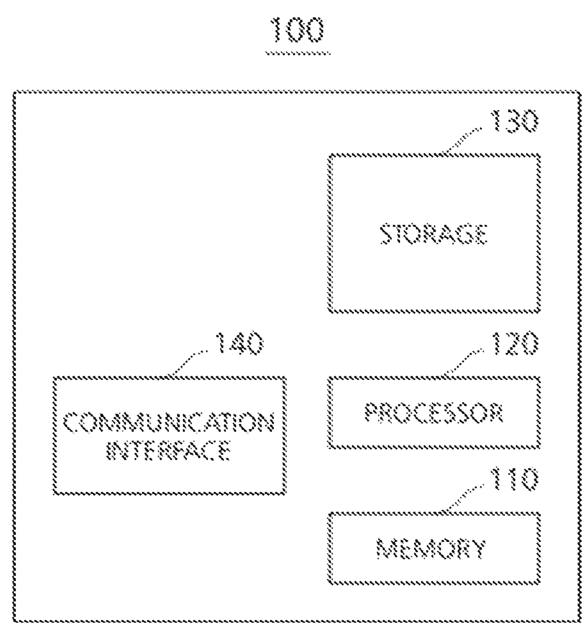
FIG. 3 is a block diagram illustrating a video call mediating apparatus providing video call service according to an embodiment of the present disclosure.

FIG. 3 is a block diagram illustrating a server providing video call service according to an embodiment of the present disclosure.

Referring to FIG. 3, the server 100 may include a memory 110, a processor 120, a storage 130, and a communication interface 140. A person skilled in the art related to the present embodiments would understand that other general components than the components shown in FIG. 3 may be further included. Each component shown in the block diagram shown in FIG. 3 may be separated, added, or omitted in accordance with the implementation of the server 100. That is, depending on the implementation one component may be divided into two or more components, two or more components may be combined into one component, and some components may be added or removed.

The memory 110 may store instructions executed by the processor 120. The memory 110 may store software or programs.

The processor 120 may execute the instructions stored in the memory 110. The processor 120 may perform overall control of the server 100. The processor 120 may obtain information and requests received through the communication interface 140 and may store the received information in the storage 130. In addition, the processor 120 may process the received information. For example, the processor 120 may generate information used for a video call service from information received from a terminal or may perform processing operations to manage the received information and store the information in the storage 130. The processor 120 may also transmit information to provide a video call service to a terminal via the communication interface 140 by using information stored in the storage 130 in response to the requests obtained from the terminal.

The storage 130 may store various kinds of software and information necessary for the server 100 to provide a video call mediation service. For example, storage 130 may store programs, applications executed on the server 100, and various data used for a video call service.

The storage 130 may store and manage personal information for each user using the video call service in a database. The storage 130 may store personal information of a user and various information used for the video call service for each account to connect to the server 100.

The communication interface 140 may perform communication with external devices including terminals. For example, the server 100 may receive a request for initiating a video call service, a request for setting information for establishing a video call service environment, etc. from a terminal, and may provide all relevant information about the video call service in response to the terminal's request.

Hereinafter, with reference to FIGS. 4 to 11, more specific operations of the first terminal 200, the second terminal 300, the third terminal 400, and the fourth terminal 500 in the video call method will be described in detail.

Figure 4:
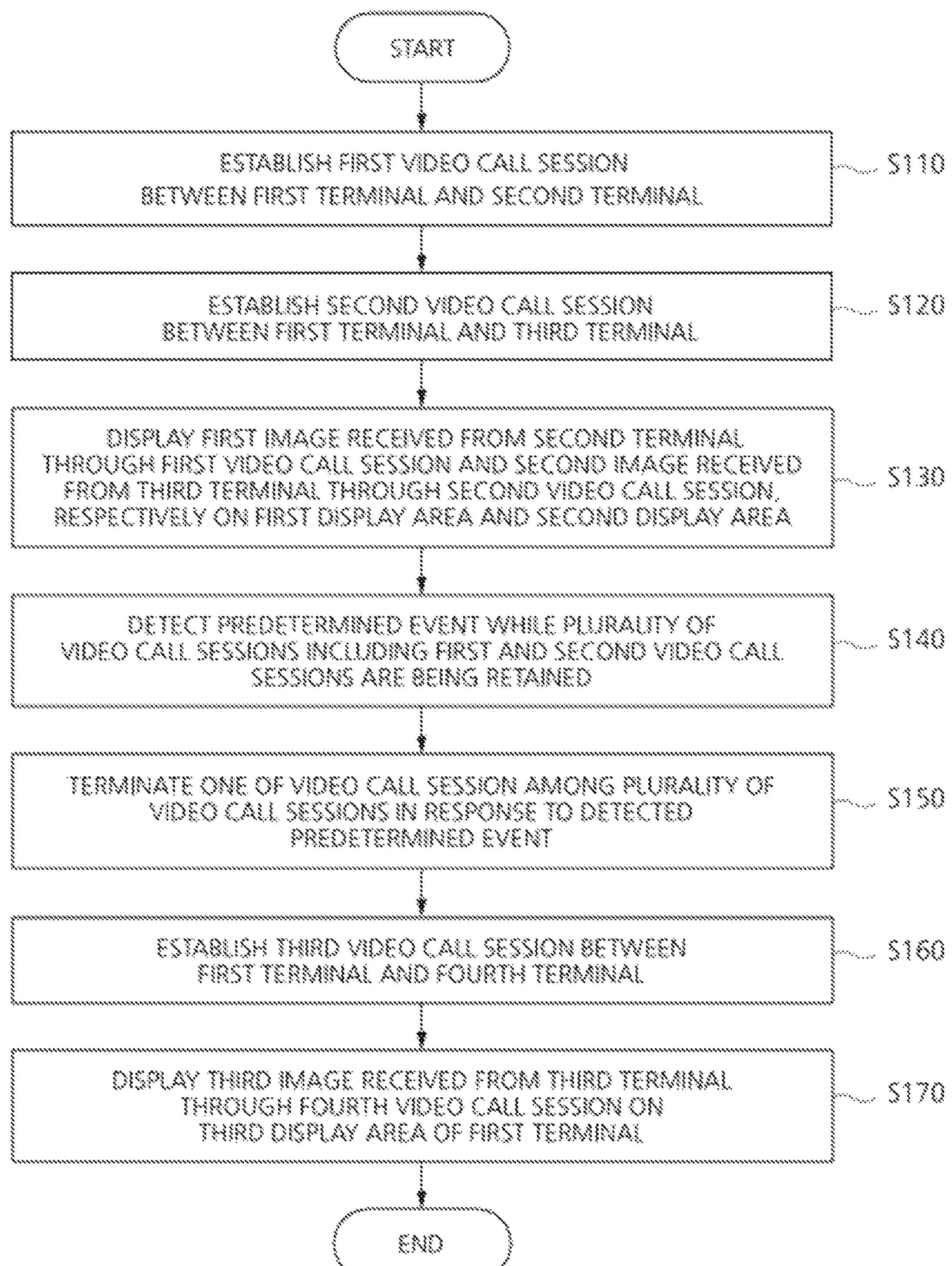
FIG. 4 is a flowchart illustrating video call method according to an embodiment of the present disclosure.

FIG. 4 is a flowchart illustrating video call method according to an embodiment of the present disclosure.

Referring to FIG. 4, a step S110 of establishing a first video call session between the first terminal 200 and the second terminal 300 may be performed. The communication unit 230 of the first terminal 210 may establish the first video call session.

In addition, a step S120 of establishing a second video call session between the first terminal and the third terminal may be performed. The communication unit 230 of the first terminal 210 may establish the second video call session. Through this, the first terminal 200 may maintain both the first video call session with the second terminal 300 and the second video call session with the third terminal simultaneously.

In addition, a step S130 of displaying a first image received from the second terminal 300 through the first video call session and a second image received from the third terminal 400 through the second video call session, respectively on a first display area and on a second display area of the first terminal 200 may be performed. The communication unit 230 of the first terminal 200 may receive image through the first video call session. The communication unit 230 may receive a data stream including encoded image from the first terminal 200. The controller 250 of the first terminal 200 may decode the received encoded image. A display 241 included the output unit 240 of the first terminal 200 may display the received image. The first display area 243 is one area of the display 241 and may display the received first image. The second display area 245 is another area of the display 241 and may display the received second image. As shown in FIG. 4, the first display area 243 and the second display area 245 have the same size and shape, and may be arranged to be vertically spaced apart from each other, but the present invention is not limited thereto.

In addition, a step S140 of detecting a predetermined event while a plurality of video call sessions including the first and the second video call sessions are being retained may be performed. For example, the predetermined event may be detecting by using a swipe input from a user of the first terminal 200 or by using tracking direction of the user's eyes. Each method will be described in detail below.

In addition, a step S150 of terminating one of video call session among the plurality of video call sessions in response to the detected predetermined event. When predetermined events are detected, in response to each event, some of the video call sessions may be terminated, and the remaining video call sessions may be retained. For example, when a predetermined event is detected, the first video call session may be terminated, the second video call session may be retained. In addition, a method that both the first video call session and the second video call session are simultaneously retained is described, but even when an additional video call session is established and retained, if predetermined events are detected, in response to each event, some of the video call sessions may be terminated, and the remaining video call sessions may be retained.

In addition, a step S160 of establishing a third video call session between the first terminal 200 and the fourth terminal 500 may be performed. In operation S150, some of the video call sessions are terminated, and to replace them, a new video call session may be established. The communication unit 230 of the first terminal 200 may establish the third video call session. Through this, the terminal 200 may maintain a plurality of video call sessions.

In addition, a step S170 of displaying a third image received from the fourth terminal 500 through the third video call session on a third display area 247 of the display 241 of the first terminal may be performed. The third display area 247 will be described in detail below.

In one embodiment, a step of the second terminal 300 receiving a fourth image from the first terminal through the first video call session, and displaying the fourth image on a display of the second terminal 300 may be performed additionally. In addition, in one embodiment, a step of the third terminal 400 receiving the fourth image from the first terminal through the first video call session, and displaying the fourth image on a display of the third terminal 400 may be performed additionally.

Specifically in one example, the first terminal 200 may display images of a user of the second terminal 300 and images of a user of the third terminal 400 on the first display area and on the second display area, respectively. Through this, a user of the first terminal 200 may perform video call with two users while visually checking two users' images simultaneously. On the other hand, by displaying images only of the user of the first terminal 200 on the second terminal 300, the user of the second terminal 300 may perform video call while visually checking images only the user of the first terminal 200. In addition, by displaying images only of the user of the first terminal 200 on the third terminal 400, the user of the third terminal 400 may also perform video call while visually checking images only the user of the first terminal 200.

Figure 5:
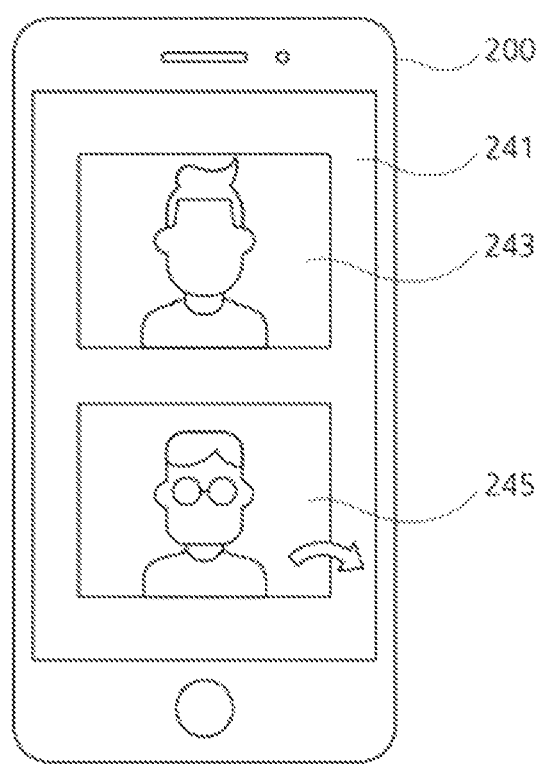
FIG. 5 is a front view of a terminal displaying images of a plurality of users during video call according to an embodiment of the present disclosure.

FIG. 5 is a front view of a terminal displaying images of a plurality of users during video call according to an embodiment of the present disclosure. Referring to FIG. 5, the input unit 240 of the first terminal 200 may include display 241. Each of the first display area 243 and the second display area 245 may be arranged in one area of the display 241.

In operation S140, the detecting the predetermined event may comprise detecting a swipe input to one area of a plurality of display areas. As illustrated in FIG. 5, the first terminal 200 may establish the first video call with the second terminal 300 corresponding to the first display area 243, and may establish the second video call with the third terminal 400 corresponding to the first display area 245. For example, the display 241 of the first terminal 200 may be implemented with a touch screen, and may operate as the input unit 210. The first terminal 200 may receive a swipe input which is input to the first display area 243 or to the second display area 245. In addition, the first terminal 200 may detect a swipe input which is input to the first display area 243 or to the second display area 245.

Figure 6:
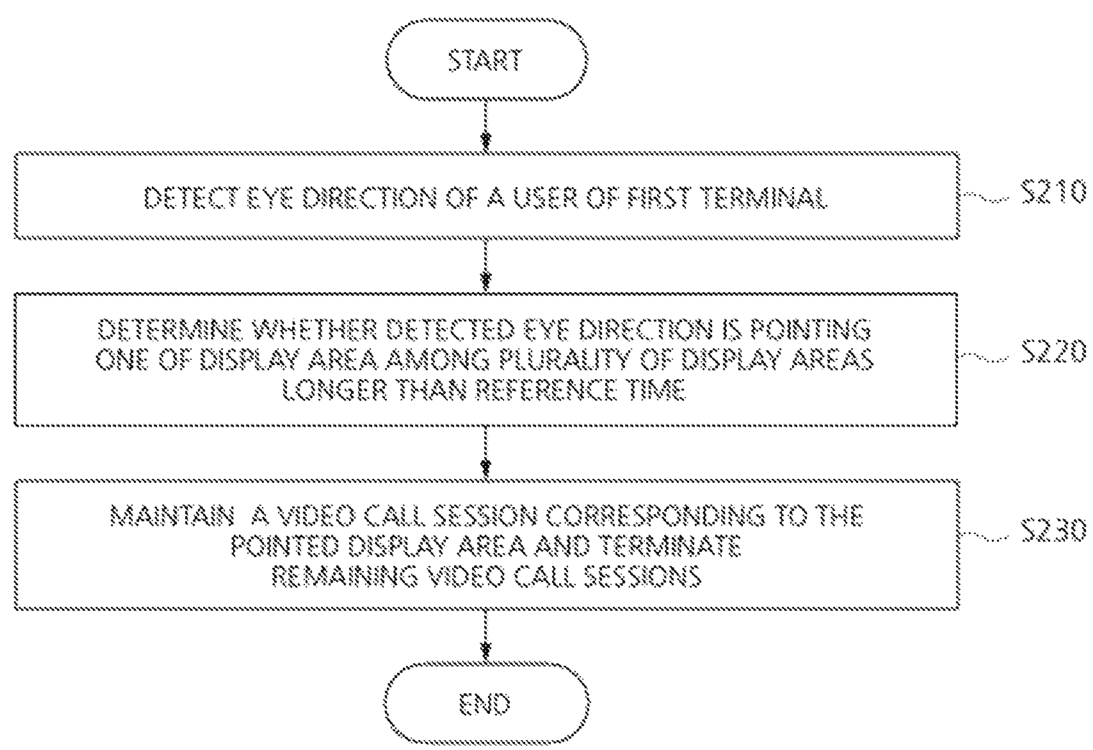
FIG. 6 is a flowchart illustrating video call mediating method using tracking a terminal user's eyes according to an embodiment of the present disclosure.

FIG. 6 is a flowchart illustrating video call mediating method using tracking a terminal user's eyes according to an embodiment of the present disclosure. In addition, FIG. 7 is a drawing illustrating a method of tracking a terminal user's eyes according to an embodiment of the present disclosure.

Figure 7:
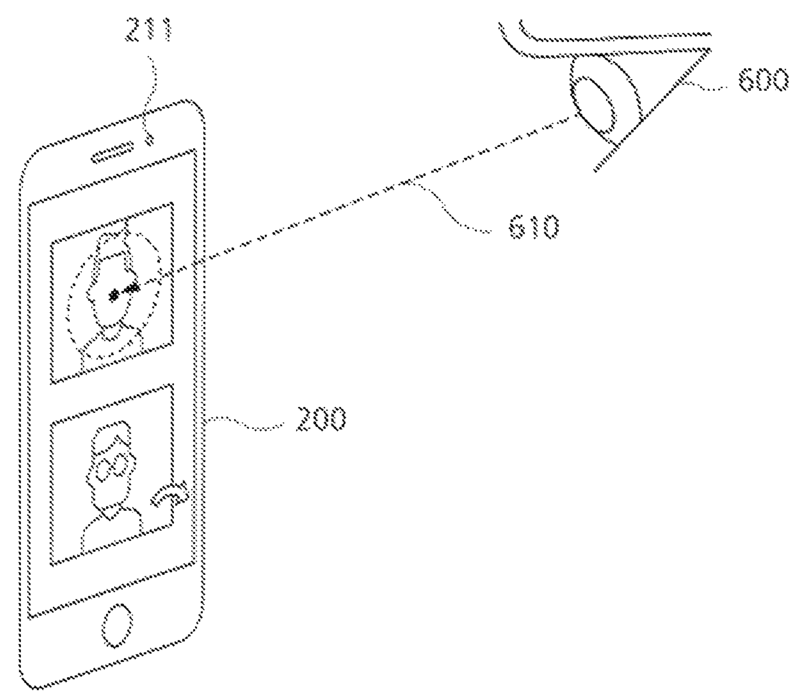
FIG. 7 is a drawing illustrating a method of tracking a terminal user's eyes according to an embodiment of the present disclosure.

Referring to FIGS. 6 and 7, first, a step S210 of detecting eye direction of a user of the first terminal 200 may be performed. Images captured by a camera 211 may be input to the controller 250 of the first terminal 200. The controller 250 of the first terminal 200 may detect the eye direction of the user from the input images. The controller 250 of the first terminal 200 may detect the eye direction of the user from the input images by using normal eye tracking technologies. For example, the controller 250 of the first terminal 200 may detect eye direction 610 of the user from the pose (position and/or direction) of the pupil of the user's eye 600.

Next, a step S220 of determining whether the detected eye direction is pointing one of a plurality of display areas may be performed. For example, the controller 250 of the first terminal 200 may determine whether the user's eye direction is pointing one of the first display area 243 and the second display area 245 longer than or equal to a reference time. When the user's eye direction is detected, a timer has a preset time (i.e., corresponding to a threshold value) may be set. For example, the time limit of the timer may be 1 second, the timer may count down from 1 to 0, and when the remaining time of the timer reaches 0 seconds, the timer may transmit a timer expiration signal to the controller 250 of the first terminal 200 or the controller 250 of the first terminal 200 may sense the timer expiration signal. Alternatively, the timer may count the elapsed time from 0 seconds, and when the elapsed time reaches 1 second, the timer may transmit the timer expiration signal to the controller 250 of the first terminal 200, or the controller 250 of the first terminal 200 may sense the timer expiration signal. The controller 250 of the first terminal 200 may determine that the eye direction of the user has pointed one of a plurality of display areas longer than or equal to the reference time if the eye direction does not change during the limit time of the timer.

Next, a step S230 of maintaining a video call session corresponding to one display area and terminating other video call sessions may be performed. For example, if it is detected that the user's eye direction of the first terminal 200 indicates the first display area 243 corresponding to the first video call session longer than or equal to the reference time after the first video call session between the first terminal 200 and the second terminal 300, and the second video call session between the first terminal 200 and the third terminal 400 are established, the first video call session between the first terminal 200 and the second terminal 300 may be retained, and, on the other hand, the second video call session between the first terminal 200 and the third terminal 400 may be terminated. For another example, after the first video call session between the first terminal 200 and the second terminal 300 and the second video call session between the first terminal 200 and the third terminal 400 are established, in response to receiving a swipe input at the second display area corresponding to the second video call session between the first terminal 200 and the third terminal 400 the second video call session may be terminated and a third video call session between the first terminal 200 and the fourth terminal 500 may be established. After that, if it is determined that a user's eye direction of the first terminal 200 indicates the first display area 243 corresponding to the first video call session longer than or equal to a reference time, the first video call session between the first terminal 200 and the second terminal 300 may be retained, and, on the other hand, the third video call session between the first terminal 200 and the fourth terminal 500 may be terminated.

Figure 8:
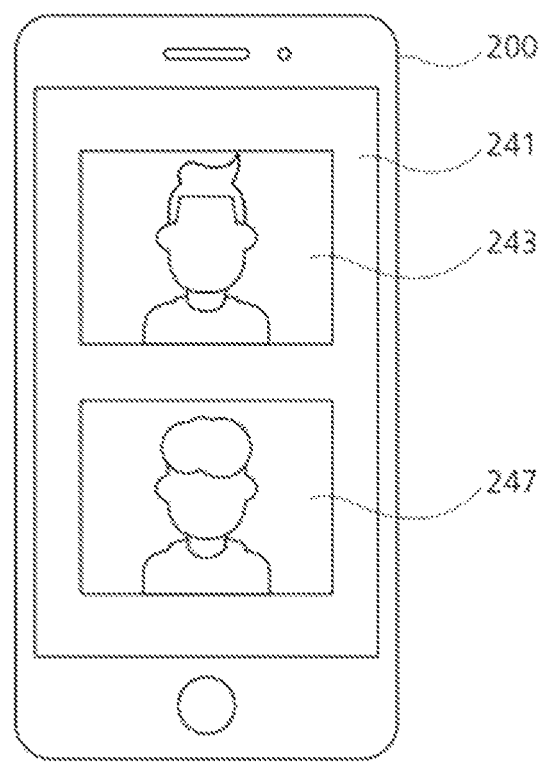
FIG. 8 is a front view of a terminal displaying images of a plurality of users during video call according to an embodiment of the present disclosure.

FIG. 8 is a front view of a terminal displaying images of a plurality of users during video call according to an embodiment of the present disclosure.

Referring to FIG. 8, a third display area may be a display area corresponding to the terminated video call session. For example, after the first video call session between the first terminal 200 and the second terminal 300 and the second video call session between the first terminal 200 and the third terminal 400 are established, and if it is determined that a user's eye direction of the first terminal 200 has indicated the first display area 243 corresponding to the first video call session, the first video call session between the first terminal 200 and the second terminal 300, and, on the other hand, the second video call session between the first terminal 200 and the third terminal 400. After that, a third video call session between the first terminal 200 and the fourth terminal 500 may be established, and the third display area corresponding to the third video call session may replace the second display area. After the first terminal 200 detects a predetermined event, even if some of video call sessions are terminated and a new video call session is added, substantially same shape of display area may be maintained.

Figure 9:
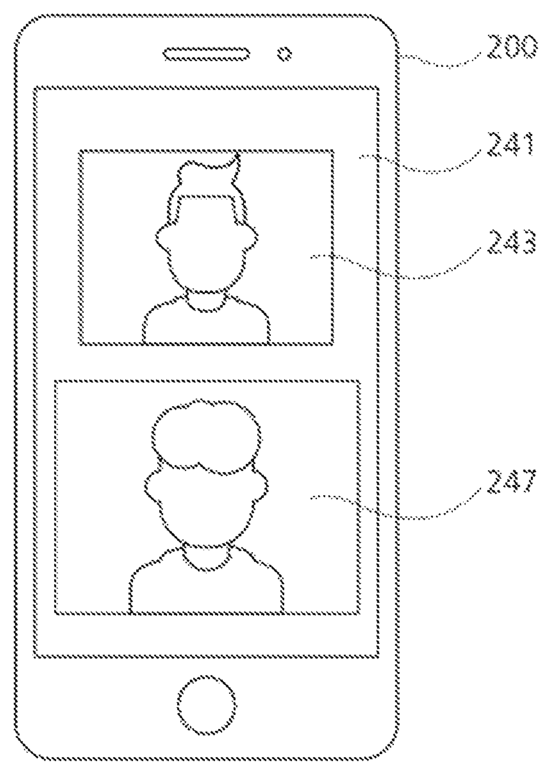
FIG. 9 is a front view of a terminal displaying images of a plurality of users during video call according to an embodiment of the present disclosure.

FIG. 9 is a front view of a terminal displaying images of a plurality of users during video call according to an embodiment of the present disclosure.

Referring to FIG. 9, a size of the third display area may be bigger than a size of the display area corresponding to the remaining video call sessions except for the terminated video call among the plurality of video call sessions. For example, after the first video call session between the first terminal 200 and the second terminal 300 and the second video call session between the first terminal 200 and the third terminal 400 are established, in response to receiving a swipe input at the second display area corresponding to the second video call session between the first terminal 200 and the third terminal 400 the second video call session may be terminated and a third video call session between the first terminal 200 and the fourth terminal 500 may be established. At this time, the third display area corresponding to the third video call session may be bigger than the second display area corresponding to the second video call session. A newly established video call session may be visually highlighted than the retained video call session.

Figure 10:
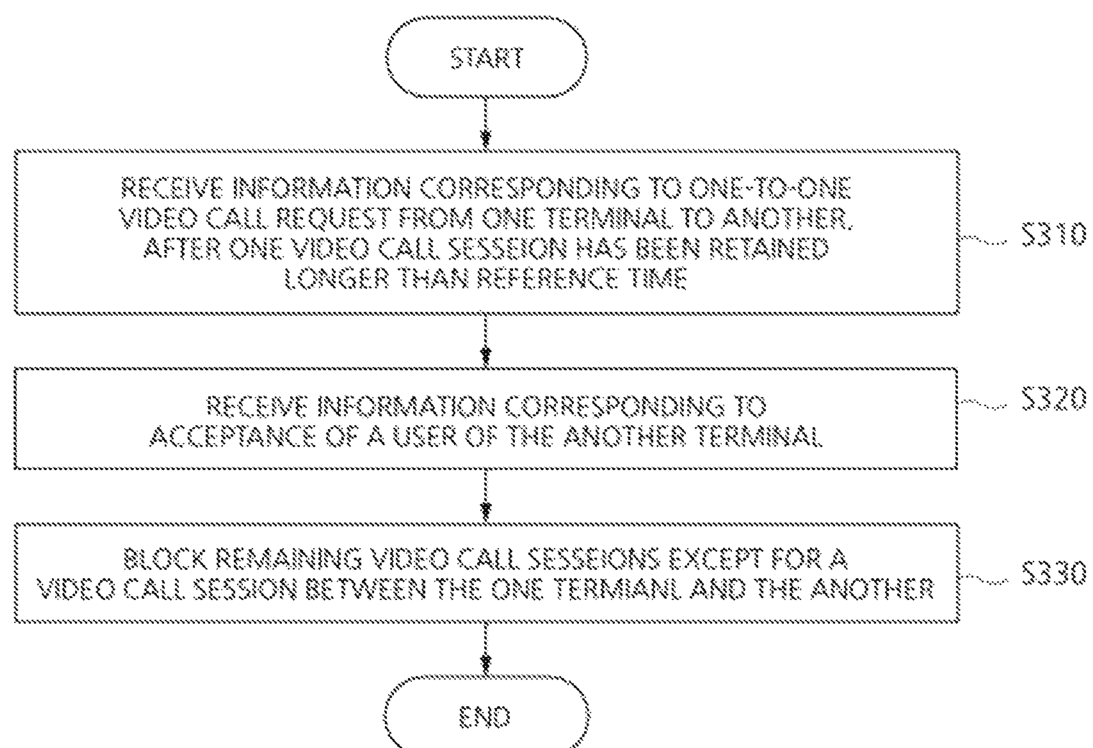
FIG. 10 is a flowchart illustrating a video call method according to an embodiment of the present disclosure.

FIG. 10 is a flowchart illustrating a video call method according to an embodiment of the present disclosure.

Referring to FIG. 10, after one video call session among a plurality of video call sessions has been retained longer than or equal to a reference time, a step S310 of receiving information corresponding to a one-to-one video call request for one terminal that has established the one video call session with may be performed. For example, once the first video call session between the first terminal 200 and the second terminal 300 is established, a timer has a preset time (i.e., corresponding to a threshold value) may be set. For a specific example, the time limit of the timer may be 1 second, the timer may count down from 1 second to 0 seconds, and when the remaining time of the timer reaches 0 seconds, the timer may transmit a timer expiration signal to the controller 250 of the first terminal 200, or the controller 250 of the first terminal 200 may sense the timer expiration signal. Alternately, the timer may count the elapsed time from 0 seconds, and when the elapsed time reaches 1 second, the timer may transmit a timer expiration signal to the controller 250 of the first terminal 200, or the controller 250 of the first terminal 200 may sense the timer expiration signal. The controller 250 of the first terminal 200 may determine that one video call session among a plurality of video call sessions has been retained longer than or equal to a reference time if the first video call session is not terminated in the limit time of the timer. After one video call session among a plurality of video call sessions retained longer than or equal to a reference time, the controller 250 of the first terminal 200 may receive information corresponding to a one-to-one video call request for one terminal that has established the one video call session with.

Next, a step S320 of receiving information corresponding to acceptance of a user of the another terminal may be performed. The controller 250 of the first terminal 200 may receive information corresponding to acceptance of a user of the one terminal.

Next, a step S330 of blocking remaining video call sessions except for the one video call session may be performed. The controller 250 of the first terminal 200 may block the remaining video call sessions except for the one video call session. By blocking the remaining video call sessions, a user of the one terminal and the counterpart may be able to keep the video call one-to-one.

Figure 11:
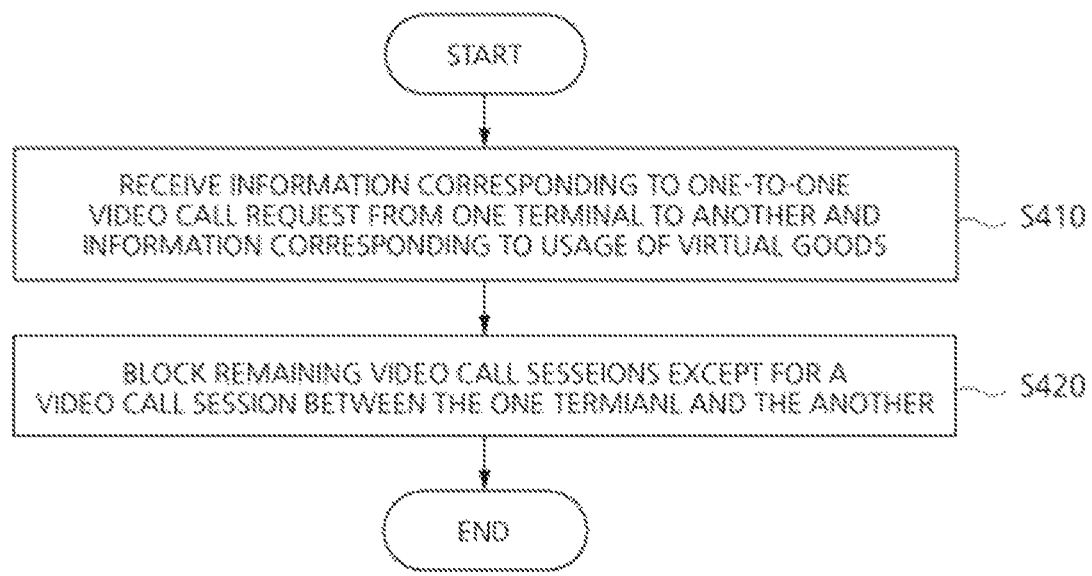
FIG. 11 is a flowchart illustrating a video call method according to an embodiment of the present disclosure.

FIG. 11 is a flowchart illustrating a video call method according to an embodiment of the present disclosure.

Referring to FIG. 11, a step S410 of receiving information corresponding to one-to-one video call request to one terminal from another terminal and information corresponding to use of virtual goods available for a video call service may be performed, where the two terminals have established a video call session among a plurality of video call sessions. The controller 250 of the first terminal 200 may receive information corresponding to one-to-one video call request to one terminal from another terminal, where the two terminals have established a video call session among a plurality of video call sessions.

In addition, the controller 250 of the first terminal 200 may receive information corresponding to use of virtual property available for a video call service. The virtual property may be virtual goods for using additional services provided for a fee by a user using the video call service. For example, a user may pay predetermined virtual property in order to perform video call matching with a counterpart of a desired conditions. A user may purchase the virtual property or may obtain the virtual property from the provider of the video call service if predetermined conditions meet.

Next, a step S420 of blocking the remaining video call sessions except for one video call session between one terminal and another may be performed. The controller 250 of the first terminal 200 may block the remaining video call sessions except for one video call session between one terminal and another. By blocking the remaining video call sessions, the users of the one terminal and another may maintain one-to-one video call.

According to another embodiment, the present invention may provide a computer-readable recording medium having recorded thereon a program for executing, in a computer the video call method described above. Specifically, the embodiments described above may be implemented in a form of recording medium including instructions executable by a computer such as program modules executed by a computer. The computer-readable medium may be arbitrary fusible media that may be accessed by computers, and may include all volatile and non-volatile media, and separable and non-separable media. In addition, the computer-readable medium may include computer storage media and communication media. The computer storage media may include all volatile and nonvolatile, and separable and non-separable media realized by an arbitrary method or technology for storing information such as computer readable commands, data structures, program modules and other data. Communication media include traditional computer readable commands, data structures, program modules, other data of modulated data signals such as carrier waves and other transmission mechanisms and may include arbitrary information transmission media.

According to another embodiments, the present invention may provide video call mediating apparatus, the apparatus may include, a communication interface communicating with each of a plurality of terminals supporting video call; a storage; a process; and a memory storing instructions executable by the processor, and the processor, by executing the instructions, establishing a first video call session between a first terminal and a second terminal, establishing a second video call session between the first terminal and a third terminal, displaying a first video received from the second terminal through the first video call session and a second video received from the third terminal through the second video call session on a first display area and on a second display area of the first terminal respectively, detecting a predetermined event while a plurality of video call sessions including the first and the second video call sessions are retaining, terminating one of video call session among the plurality of video call sessions in response to the detected predetermined event, establishing a third video call session between the first terminal and a fourth terminal, displaying a third video received from the fourth terminal through the third video call session on a third display area of the first terminal.

The video call mediating apparatus described above may be the server 100. Further, descriptions of the components of the server 100 operated in the same or the similar manner with the disclosures may be omitted. The disclosures are regarding video call method and computer-readable recording medium having a program for executing the video call method on a computer.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the tow. Computer-executable instructions for implementing a method, process, or algorithm described in connection with embodiments disclosed herein can be stored in a non-transitory computer readable storage medium.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. A video call method between a plurality of terminals, the method comprising:

establishing, by a first terminal, a first video call session with a second terminal, the first terminal having a plurality of display areas comprising first, second and third display areas;

establishing, by the first terminal, a second video call session with a third terminal;

displaying, by the first terminal, a first image received from the second terminal through the first video call session and a second image received from the third terminal through the second video call session on a first display area and on a second display area, respectively, detecting, by the first terminal, a predetermined event while a plurality of video call sessions including the first and the second video call sessions are being maintained;

terminating, by the first terminal, one video call session among the video call sessions in response to the detecting the predetermined event, establishing, by the first terminal, a third video call session with a fourth terminal;

displaying, by the first terminal, a third image received from the fourth terminal through the third video call session on a third display area;

determining that one video call session among the video call sessions has been maintained longer than a reference time period, receiving information corresponding to one-to-one video call request from one terminal to another terminal which established the maintained one video call session, receiving information corresponding to acceptance from a user of the other terminal; and blocking a video call sessions other than a video call sessions between the one terminal requested the one-to-one video call and the other terminal.

2. The method according to claim 1, further comprising:

receiving, by the second terminal, a fourth image from the first terminal through the first video call session; and displaying, by the second terminal, the fourth image on a display area of the second terminal.

3. The method according to claim 2, further comprising:

receiving, by the third terminal, the fourth image from the first terminal through the second video call session; and displaying, by the third terminal, the fourth image on a display area of the third terminal.

4. The method according to claim 1, wherein the detecting the predetermined event comprises detecting a swipe input to one of the display areas.

5. The method according to claim 1, wherein the detecting the predetermined event and the terminating one video call session among the video call sessions comprises:

detecting eye direction of a user of the first terminal, by using a camera included in the first terminal;

determining whether the detected eye direction is pointing one of the display areas longer than or equal to a reference time period; and maintaining a video call session corresponding to the pointed display area and terminating the remaining video call sessions, based on the determination.

6. The method according to claim 1, wherein the third display area is corresponding to the terminated video call session.

7. The method according to claim 6, wherein a size of the third display area is bigger than a size of the other display areas corresponding to the remaining video call sessions except for the terminated video call session.

8. The method according to claim 1, further comprising receiving info, illation corresponding to one-to-one video call request from one terminal to another terminal which established a video call session, and information corresponding to virtual goods available for paying for a service of the video call session; and blocking a video call session other than a video call session between the one terminal requested the one-to-one video call and the other terminal.

9. A computer-readable recording medium having recorded thereon a program for executing, in a computer the video call method in claim 1.

10. A video call mediating apparatus, the apparatus comprising:

a communication interface communicating with each of a plurality of terminals supporting a video call;

a storage;

a processor; and a memory configured to store instructions executable by the processor, wherein the processor, by executing the instructions, is configured to:

establish a first video call session between a first terminal and a second terminal, the first terminal having a plurality of display areas comprising first, second and third display areas;

establishes a second video call session between the first terminal and a third terminal;

display a first image received from the second terminal through the first video call session and a second image received from the third, terminal through the second video call session on a first display area and on a second display area of the first terminal, respectively;

detect a predetermined event while a plurality of video call sessions including the first and the second video call sessions are been maintained;

terminate one video call session among the video call sessions in response to the detecting the predetermined event, establish a third video call session between the first terminal and a fourth terminal; and display a third image received from the fourth terminal through the third video call session on a third display area of the first terminal, wherein the processor is further configured to:

detect eye direction of a user of the first terminal, by using a camera included in the first terminal, determine whether the detected eye direction is pointing one of the display areas longer than a reference time period, and maintain a video call session corresponding to the pointed display area and terminating the remaining video call sessions, based on the determination.

11. The apparatus according to claim 10, wherein the predetermined event is a swipe input to one of the display areas.

12. The apparatus according to claim 10, wherein the third display area is corresponding to the terminated video call session.

13. The apparatus according to claim 12, wherein a size of the third display area is bigger than a size of the other display areas corresponding to the remaining video call sessions except for the terminated video call session.

14. The apparatus according to claim 10, wherein in response to determining that one video call session among the video call sessions has been maintained longer than a reference time period, the processor is further configured to:

receive information corresponding to one-to-one video call request from one terminal to another terminal which established the maintained video call session;

receive information corresponding to acceptance from a user of the other terminal; and blocking a video call session other than a video call session between the one terminal requested the one-to-one video call and the other terminal.

15. The apparatus according to claim 10, wherein the processor is further configured to:

receive information corresponding to one-to-one video call request from one terminal to another terminal which established a video call session, and information corresponding to virtual goods available for paying for a service of video call session, blocking a video call session other than a video call session between the one terminal requested the one-to-one video call and the other terminal.

* * * * *